US012661900B2

(12) United States Patent
Hayashi et al.

(10) Patent No.: US 12,661,900 B2
(45) Date of Patent: Jun. 23, 2026

(54) IMAGE-FORMING APPARATUS INCLUDING RECORDING HEAD CONNECTABLE TO LIQUID CONTAINER THROUGH JOINT, A PLURALITY OF LIQUID CHANNELS, AND A PLURALITY OF TUBES

(71) Applicant: BROTHER KOGYO KABUSHIKI KAISHA, Nagoya (JP)

(72) Inventors: Masahiro Hayashi, Anjo (JP); Naoya Okazaki, Hashima (JP); Yuma Tanabe, Nagoya (JP); Satoru Oki, Nagoya (JP); Yuji Fukuta, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 126 days.

(21) Appl. No.: 18/389,941

(22) Filed: Dec. 20, 2023

(65) Prior Publication Data

US 2024/0217242 A1 Jul. 4, 2024

(30) Foreign Application Priority Data

Dec. 28, 2022 (JP) ................................ 2022-211059

(51) Int. Cl.
*B41J 2/175* (2006.01)

(52) U.S. Cl.
CPC ....... *B41J 2/17553* (2013.01); *B41J 2/17566* (2013.01); *B41J 2002/17573* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17566; B41J 2/17553; B41J 2002/17573; B41J 29/13
See application file for complete search history.

(56) References Cited

U.S. PATENT DOCUMENTS

| | | | | |
|---|---|---|---|---|
| 6,969,161 | B2 * | 11/2005 | Kuwabara | B41J 2/17509 347/85 |
| 11,472,191 | B2 * | 10/2022 | Takei | B41J 2/17556 |
| 11,858,272 | B2 * | 1/2024 | Chang | B41J 2/17509 |
| 2003/0128256 | A1 * | 7/2003 | Oda | B41J 2/17513 347/85 |
| 2005/0206696 | A1 | 9/2005 | Inoue | |

(Continued)

FOREIGN PATENT DOCUMENTS

| | | | |
|---|---|---|---|
| JP | 2005-306016 | A | 11/2005 |
| JP | 2010-264670 | A | 11/2010 |

(Continued)

*Primary Examiner* — Anh T Vo
(74) *Attorney, Agent, or Firm* — Merchant & Gould P.C.

(57) ABSTRACT

An image-forming apparatus includes a liquid container, a joint, a branching portion, a plurality of tubes, and a recording head. The liquid container has a first storage chamber, and a supply opening through which the first storage chamber is communicable with atmosphere. The joint is connectable to the supply opening of the liquid container. The branching portion is connected to the joint and is branched into a plurality of liquid channels. Each tube is connected to a corresponding one of the plurality of liquid channels. The recording head includes a plurality of nozzle arrays, and each nozzle array is connected to a corresponding one of the plurality of tubes. The recording head is configured to eject the liquid through each nozzle arrays.

14 Claims, 12 Drawing Sheets

(56) References Cited

U.S. PATENT DOCUMENTS

| | | | |
|---|---|---|---|
| 2011/0050793 A1 | 3/2011 | Kumagai et al. | |
| 2011/0199440 A1 | 8/2011 | Kobashi | |
| 2013/0235129 A1 | 9/2013 | Masanuga | |
| 2014/0104348 A1 | 4/2014 | Owaki et al. | |
| 2016/0243838 A1 | 8/2016 | Kato | |

FOREIGN PATENT DOCUMENTS

| | | | |
|---|---|---|---|
| JP | 2010-274608 | A | 12/2010 |
| JP | 2011-161881 | A | 8/2011 |
| JP | 2013-184469 | A | 9/2013 |
| JP | 2014-054857 | A | 3/2014 |
| JP | 2014-079895 | A | 5/2014 |
| JP | 2016-153183 | A | 8/2016 |
| JP | 2016-203614 | A | 12/2016 |

* cited by examiner

IMAGE-FORMING APPARATUS INCLUDING RECORDING HEAD CONNECTABLE TO LIQUID CONTAINER THROUGH JOINT, A PLURALITY OF LIQUID CHANNELS, AND A PLURALITY OF TUBES

REFERENCE TO RELATED APPLICATIONS

This application claims priority from Japanese Patent Application No. 2022-211059 filed on Dec. 28, 2022. The entire content of the priority application is incorporated herein by reference.

BACKGROUND ART

There has been known a printer including a recording head configured to eject ink supplied from an ink cartridge through nozzles. The ink cartridge and the recording head are connected to each other through an ink channel, such as an ink tube, to provide circulation of ink between the ink cartridge and the recording head.

DESCRIPTION

One of such conventional printers is configured to perform color printing on a fabric, such as a T-shirt. On the other hand, there has been known a monochrome printer configured to perform printing using only black ink to mainly print characters for business purposes, for example. For such monochrome printers to be used for business purposes, a storage chamber with a larger capacity is desirable to store a larger amount of black ink therein, so that printing can be performed on as many sheets as possible without replenishment of black ink into the storage chamber. However, conceivably, designing components not only for a monochrome printer but also for a color printer would involve significant development costs.

In view of the foregoing, it is an object of the present disclosure to provide an image-forming apparatus having a storage chamber with a larger capacity, as well as realizing enhanced versatility of components thereof.

In order to attain the above and other objects, according to one aspect, the present disclosure provides an image-forming apparatus including a liquid container, a joint, a branching portion, a plurality of tubes, and a recording head. The liquid container includes: a first storage chamber configured to store liquid therein; and a supply opening through which the first storage chamber is allowed to communicate with an outside of the liquid container. The joint is connectable to the supply opening of the liquid container. The branching portion is connected to the joint. The branching portion is branched into a plurality of liquid channels. Each of the plurality of tubes is connected to a corresponding one of the plurality of liquid channels. The recording head includes a plurality of nozzle arrays. Each nozzle array is an array of nozzles and is connected to a corresponding one of the plurality of tubes. The recording head is configured to eject the liquid through each nozzle array.

With this structure, monochrome printing can be performed using the recording head having a plurality of nozzle arrays.

According to another aspect, the present disclosure also provides an image-forming apparatus including a liquid container, a joint, a tube, a branching portion, and a recording head. The liquid container includes: a first storage chamber configured to store liquid therein; and a supply opening through which the first storage chamber is allowed to communicate with an outside of the liquid container. The joint is connectable to the supply opening of the liquid container. The tube is connected to the joint. The branching portion is connected to the tube. The branching portion is branched into a plurality of liquid channels. The recording head includes a plurality of nozzle arrays. Each nozzle array is an array of nozzles and is connected to a corresponding one of the plurality of liquid channels. The recording head is configured to eject the liquid through each nozzle array.

With this structure, monochrome printing can be performed using the recording head having a plurality of nozzle arrays. Further, the first storage chamber of the liquid container can have a larger volume to store the liquid.

According to still another aspect of the disclosure, the present disclosure also provides an image-forming apparatus including a liquid container, a plurality of joints, a plurality of second storage chambers, a plurality of liquid channels, a plurality of tubes, and a recording head. The liquid container includes: a first storage chamber configured to store liquid therein; and a plurality of supply openings through which the first storage chamber is allowed to communicate with an outside of the liquid container. Each of the plurality of joints is connectable to a corresponding one of the plurality of supply openings of the liquid container. Each of the plurality of second storage chambers is connected to a corresponding one of the plurality of joints. Each of the plurality of liquid channels is connected to a corresponding one of the plurality of second storage chambers. Each of the plurality of tubes is connected to a corresponding one of the plurality of liquid channels. The recording head includes a plurality of nozzle arrays, each nozzle array being an array of nozzles and being connected to a corresponding one of the plurality of tubes. The recording head is configured to eject the liquid through each nozzle array.

With this structure, monochrome printing can be performed using the recording head having a plurality of nozzle arrays. Further, the first storage chamber of the liquid container can have a larger volume to store the liquid.

EMBODIMENT

Figure 1:
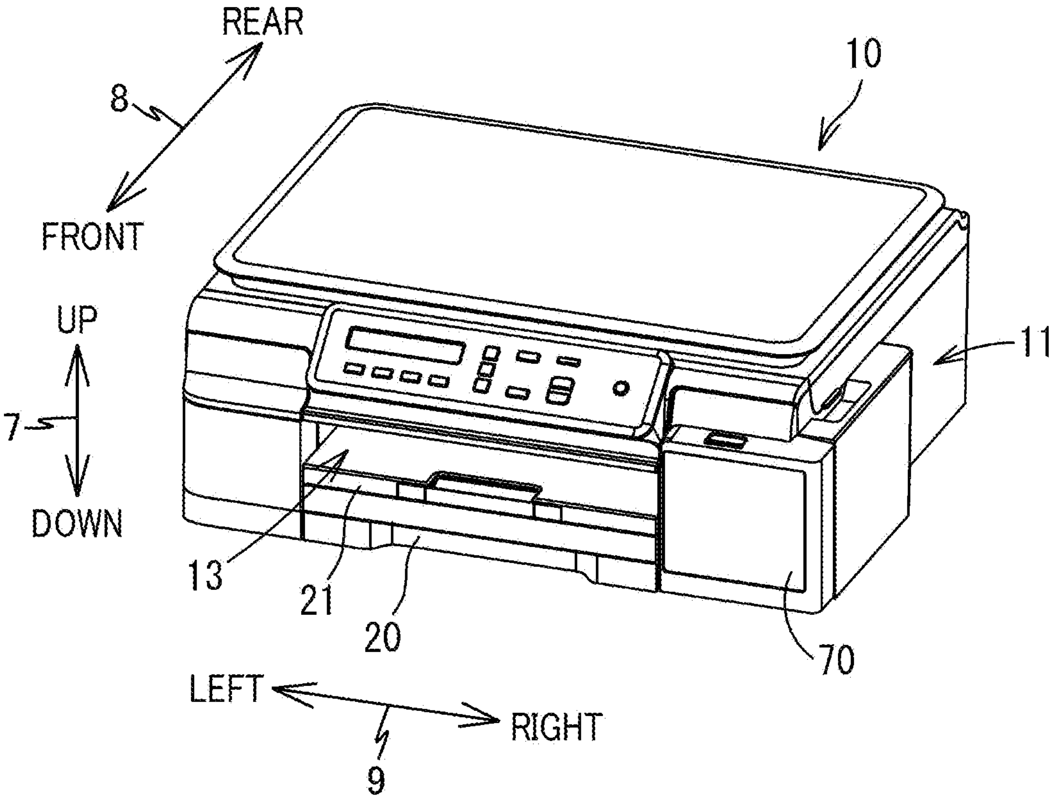
FIG. 1 is a perspective view illustrating an exterior of a multifunction peripheral 10 according to one embodiment.

Hereinafter, one embodiment of the present disclosure will be described with reference to FIGS. 1 through 6.

In the following description, each arrow in the drawings advancing from an origin to an end point thereof represents one component of its corresponding direction. Specifically, an upward direction and a downward direction are each one component of an up-down direction 7, and are respectively opposite each other. A leftward direction and a rightward direction are each one component of a left-right direction 9, and are opposite each other. Likewise, a frontward direction and a rearward direction are each one component of a front-rear direction 8, and are respectively opposite each other. In the present embodiment, the up-down direction 7 coincides with a vertical direction, and the front-rear direction 8 and the left-right direction 9 are both horizontal.

Further, in the present disclosure, the up-down direction 7 will be referred to assuming that a multifunction peripheral 10 is placed so as to be operable. Specifically, the multifunction peripheral 10 is assumed to be operable when placed in an orientation or posture illustrated in FIG. 1 (will be referred to as "operable orientation" or "operable posture", whenever appropriate). The front-rear direction 8 be referred to assuming that a surface of the multifunction peripheral 10 having an opening 13 (see FIG. 1) is defined as a front surface of the multifunction peripheral 10. The left-right direction 9 be referred to assuming that the multifunction peripheral 10 is viewed from its front side.

[Overall Structure of the Multifunction Peripheral 10]

As illustrated in FIG. 1, the multifunction peripheral 10 has an outer shape of a substantially rectangular parallelepiped. The multifunction peripheral 10 includes a printer portion 11. The printer portion 11 is configured to record an image on a sheet 12 (see FIG. 2) in accordance with an inkjet recording method.

Figure 2:
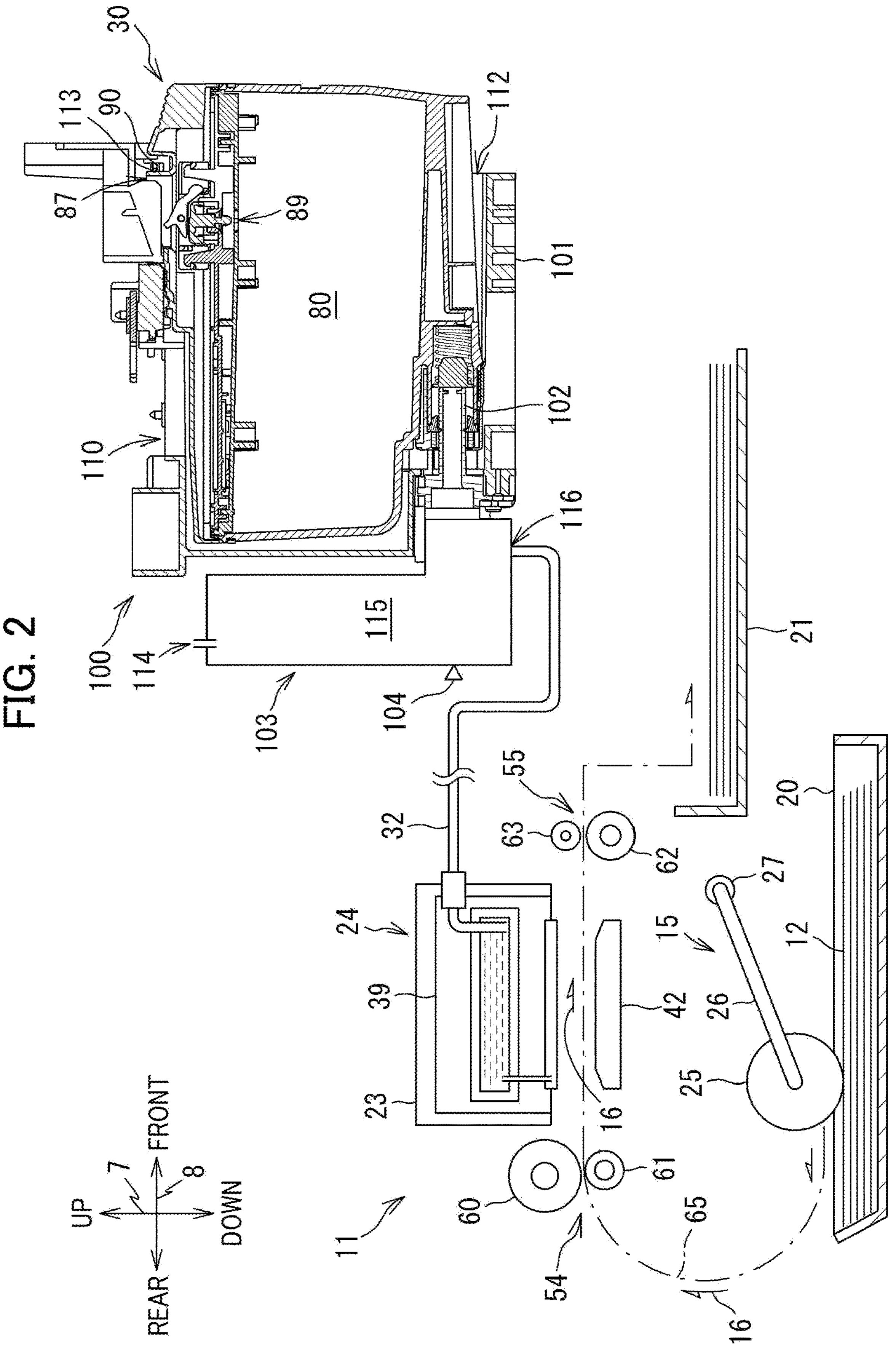
FIG. 2 is a vertical cross-sectional view schematically illustrating an internal configuration of a printer portion 11 of the multifunction peripheral 10.

As illustrated in FIG. 2, the printer portion 11 includes a sheet pick-up unit 15, a sheet tray 20, a discharge tray 21, a feed roller unit 54, a recording portion 24, a discharge roller unit 55, a platen 42, and a refill unit 100. The multifunction peripheral 10 has various functions such as a facsimile function and a printing function.

The refill unit 100 is positioned rearward of a cover 70 that is provided at the front surface of a housing of the multifunction peripheral 10. The cover 70 is pivotable, relative to the housing, to cover and uncover the refill unit 100. When the cover 70 is opened, the refill unit 100 is exposed to an outside to be accessible to a user. The multifunction peripheral 10 is an example of an "image-forming apparatus" of the disclosure.

[Sheet Tray 20 and Discharge Tray 21]

As illustrated in FIG. 1, the opening 13 is formed on the front surface of the multifunction peripheral 10 at a center portion thereof in the left-right direction 9. The sheet tray 20 is movable, relative to the housing, in the front-rear direction 8 through the opening 13 by a user's operation. The sheet tray 20 is configured to support a plurality of the sheets 12 in a stacked state.

The discharge tray 21 is positioned above the sheet tray 20. The discharge tray 21 is movable in the front-rear direction 8 together with the sheet tray 20. The discharge tray 21 is configured to support the sheets 12 discharged by the discharge roller unit 55.

[Sheet Pick-Up Unit 15]

The sheet pick-up unit 15 is configured to feed each sheet 12 supported on the sheet tray 20 to a conveying path 65. As illustrated in FIG. 2. the sheet pick-up unit 15 includes a pick-up roller 25, a pick-up arm 26, and a shaft 27. The pick-up roller 25 is rotatably supported by a free end portion of the pick-up arm 26. The pick-up roller 25 is configured to rotate to convey the sheet 12 in a sheet conveying direction 16 in response to a driving force of a conveyor motor (not illustrated). The pick-up arm 26 is pivotally movable about an axis of the shaft 27 that is supported by a frame (not illustrated) of the printer portion 11. The pick-up arm 26 is urged, by its own weight or by a resiliently urging force of a spring (not illustrated), such that the pick-up arm 26 is pivotable toward the sheet tray 20.

[Conveying Path 65]

Figure 3:
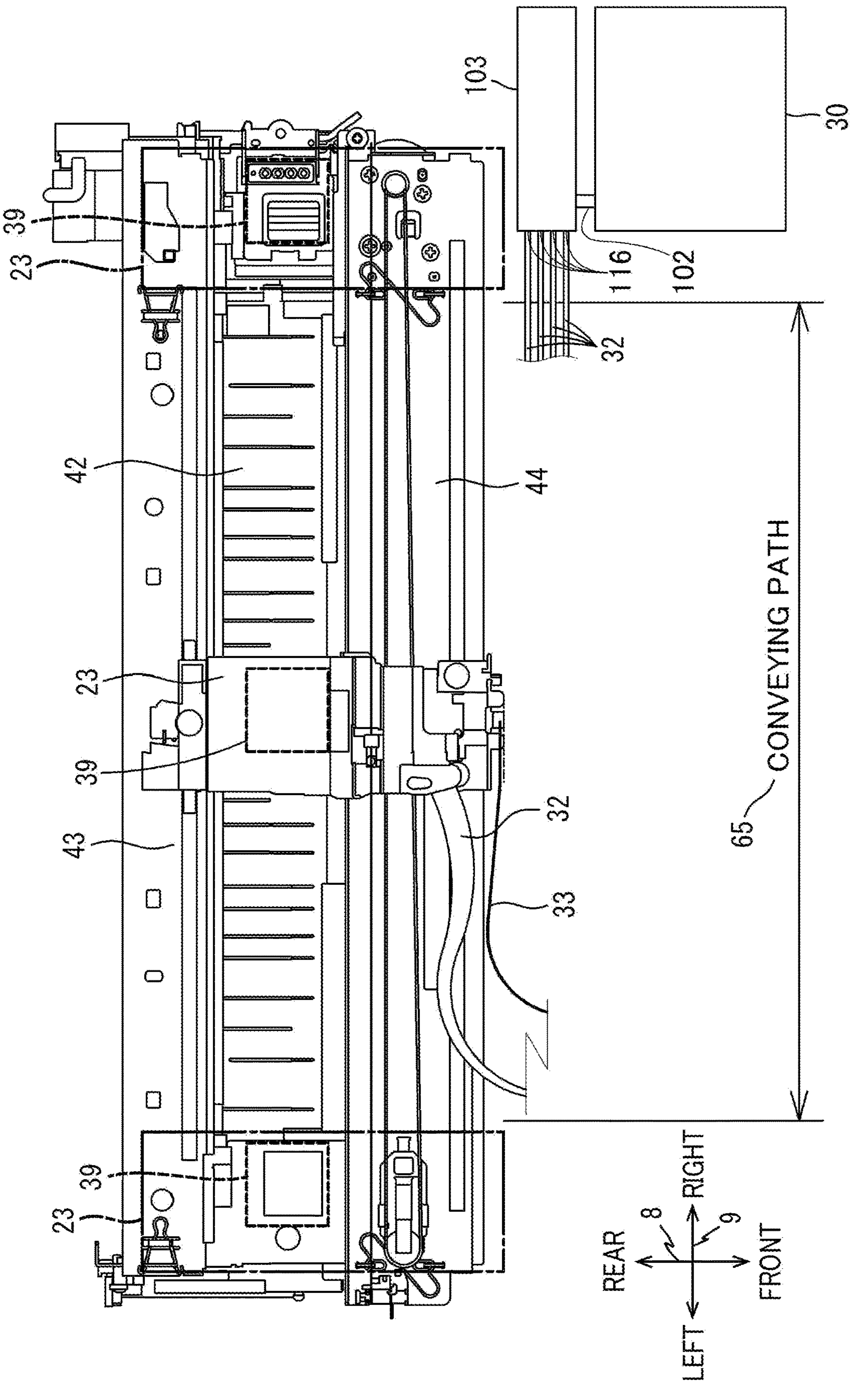
FIG. 3 is a plan view schematically illustrating an internal structure of the printer portion 11.

As illustrated in FIG. 2, the conveying path 65 is defined inside the printer portion 11. The conveying path 65 is a space defined by, for example, outer and inner guide members (not illustrated) arranged to oppose each other with a predetermined gap therebetween. The conveying path 65 extends upward and rearward from a rear end portion of the sheet tray 20, then makes a U-turn to extend frontward through a space between the recording portion 24 and the platen 42, and finally reaches the discharge tray 21. As illustrated in FIGS. 2 and 3, a portion of the conveying path 65 between the feed roller unit 54 and the discharge roller unit 55 is positioned substantially at a center portion of the multifunction peripheral 10 in the left-right direction 9 and extends in the front-rear direction 8. The sheet conveying direction 16 for each sheet 12 in the conveying path 65 is indicated by a dotted-chain-line arrow in FIG. 2.

[Feed Roller Unit 54]

As illustrated in FIG. 2, the feed roller unit 54 is positioned upstream of the recording portion 24 in the sheet conveying direction 16. The feed roller unit 54 includes a conveying roller 60 and a pinch roller 61 positioned to oppose each other in the up-down direction 7. The conveying roller 60 is configured to rotate upon receipt of a driving force of the conveyer motor. The pinch roller 61 is configured to rotate following the rotation of the conveying roller 60. As the conveying roller 60 rotates in the forward direction in response to the forward rotation of the conveyor motor, each sheet 12 is configured to be conveyed in the sheet conveying direction 16 while being nipped between the conveying roller 60 and the pinch roller 61.

[Discharge Roller Unit 55]

As illustrated in FIG. 2, the discharge roller unit 55 is positioned downstream relative to the recording portion 24 in the sheet conveying direction 16. The discharge roller unit 55 includes a discharging roller 62 and a spur 63 positioned to oppose each other in the up-down direction 7. The discharging roller 62 is configured to rotate by the driving force of the conveyor motor. The spur 63 is configured to rotate following the rotation of the discharging roller 62. As the discharging roller 62 rotates forward by the forward rotation of the conveyor motor, each sheet 12 is configured to be conveyed in the sheet conveying direction 16 while being nipped between the discharging roller 62 and the spur 63.

[Recording Portion 24]

As illustrated in FIG. 2, the recording portion 24 is positioned between the feed roller unit 54 and the discharge roller unit 55 in the sheet conveying direction 16. The recording portion 24 is positioned opposite the platen 42 with respect to the conveying path 65 in the up-down direction 7. The recording portion 24 is positioned above the conveying path 65 in the up-down direction 7. The recording portion 24 includes a carriage 23 and a recording head 39.

As illustrated in FIG. 3, the carriage 23 is supported by guide rails 43 and 44. The guide rails 43 and 44 are supported by the frame (not illustrated) of the printer portion 11. The guide rails 43 and 44 extend in the left-right direction 9 and are spaced apart from each other in the front-rear direction 8. The carriage 23 is connected to a well-known belt mechanism provided at the guide rail 44. The belt mechanism is configured to be driven by a carriage-driving motor (not illustrated). The carriage 23 is configured to move reciprocatingly in the left-right direction 9 in response to circular movement of the belt mechanism. The carriage 23 is configured to move, with respect to the left-right direction 9, in a prescribed range which is indicated by one-dotted chain lines in FIG. 3. Specifically, the carriage 23 is movable in the left-right direction 9 in such a range that: up to a point beyond a right end of the conveying path 65 in the rightward direction, and up to a point beyond a left end pf the conveying path 65 in the leftward direction. The left-right direction 9 is an example of a "scanning direction" of the disclosure.

As illustrated in FIG. 3, the recording head 39 is connected to the refill unit 100 through four ink tubes 32. The recording head 39 includes a head control board (not illustrated) that is electrically connected, through a flexible flat cable 33, to a control board (not illustrated) on which a controller (not illustrated) is surface-mounted. The four ink tubes 32 and the flexible flat cable 33 respectively extend from the carriage 23. The four ink tubes 32 allow ink stored in the refill unit 100 to be supplied to the recording head 39. Specifically, a bundle of the four ink tubes 32 extends from a tank 103 of the refill unit 100 and is connected to the recording head 39. The flexible flat cable 33 is configured to transmit control signals outputted from the controller to the recording head 39.

Figure 4:
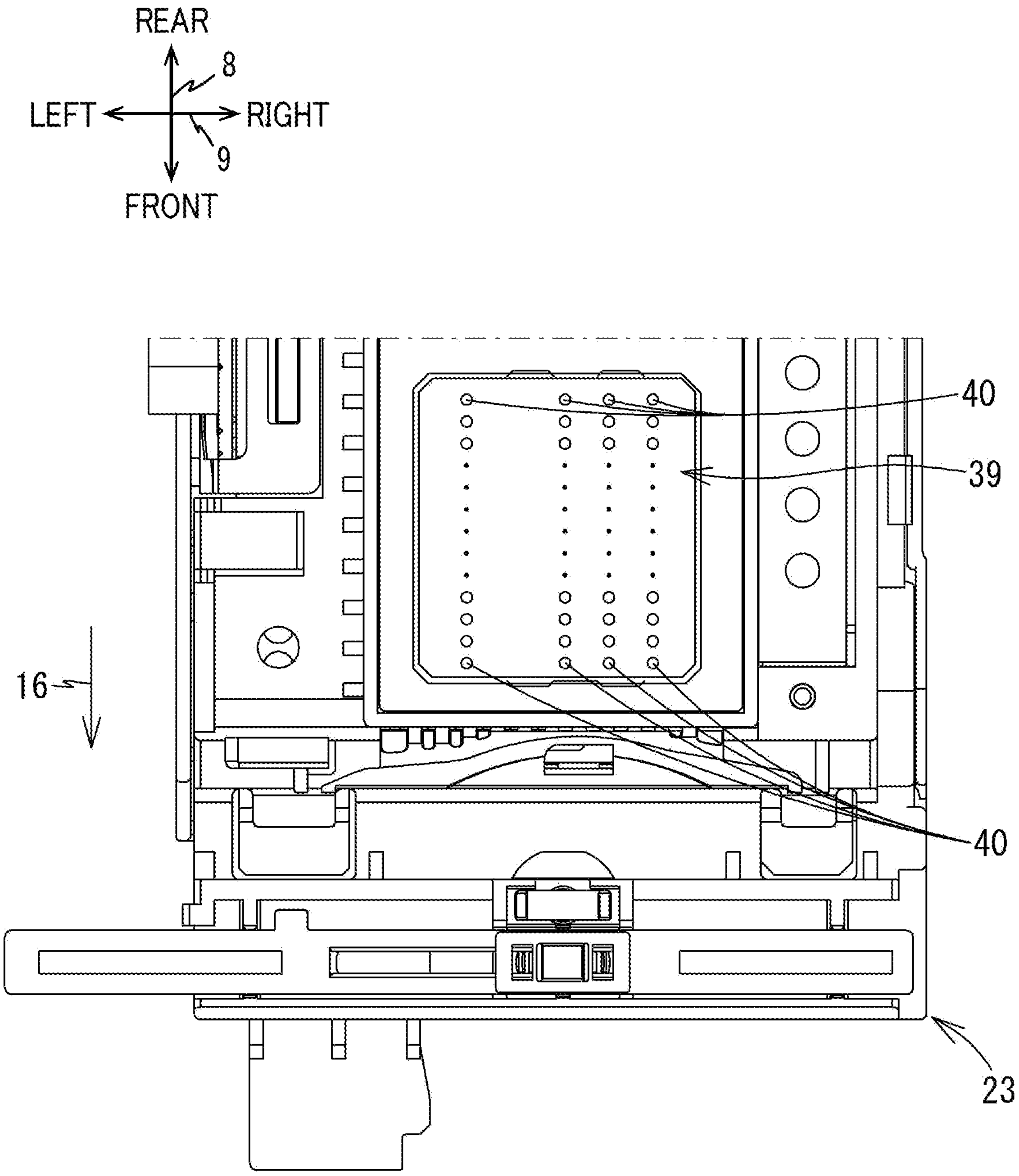
FIG. 4 is a partially enlarged view illustrating a nozzle surface of a recording head 39 of the printer portion 11.

As illustrated in FIG. 2, the recording head 39 is mounted on the carriage 23. As illustrated in FIG. 4, the recording head 39 has a lower surface formed with a plurality of nozzles 40. The nozzles 40 are arranged in line in the front-rear direction 8 to form four arrays juxtaposed in the left-right direction 9. The four arrays of the nozzles (nozzle arrays) 40 correspond to the four ink tubes 32, respectively. Ink is configured to be supplied to each nozzle 40 in each nozzle array through the corresponding one of the four ink tubes 32.

Although not illustrated in the drawings, the recording head 39 includes a plurality of piezoelectric elements each corresponding to one of the plurality of nozzles 40. The head control board of the recording head 39 is configured to selectively apply drive voltages to the piezoelectric elements based on recorded data to perform printing. In accordance with deformation of the selected piezoelectric elements, ink is configured to be ejected from the selected nozzles to eject ink as minute ink droplets through the nozzles 40. While the carriage 23 moves reciprocatingly in the left-right direction 9, the recording head 39 ejects the ink droplets, through the nozzles 40, onto the sheet 12 supported by the platen 42. In this way, an image is recorded on each sheet 12. The nozzles 40 are an example of an "nozzle array" of the disclosure.

[Platen 42]

As illustrated in FIG. 2, the platen 42 is positioned between the feed roller unit 54 and the discharge roller unit 55 in the sheet conveying direction 16. The platen 42 is positioned to oppose the recording portion 24 in the up-down direction 7. The platen 42 supports the sheet 12 conveyed by the feed roller unit 54 from below.

[Refill Unit 100]

As illustrated in FIG. 2, the multifunction peripheral 10 includes the refill unit 100. The refill unit 100 is configured to supply ink to the recording head 39. The refill unit 100 includes the tank 103, and a cartridge-receiving section 110 to which an ink cartridge 30 is detachably attachable. Incidentally, FIG. 2 illustrates a state where attachment of the ink cartridge 30 to the cartridge-receiving section 110 is completed. In other words, in FIG. 2, the ink cartridge 30 is in an attached state. The ink cartridge 30 in the attached state is in the operable posture.

Further, incidentally, the relative positional relationship between the recording portion 24 and the refill unit 100 illustrated in FIG. 2 is different from the actual positional relationship therebetween. Specifically, a first storage chamber 80 (described later) of the ink cartridge 30 is actually positioned below the recording portion 24, although the first storage chamber 80 is depicted as being positioned above the recording portion 24 in FIG. 2.

[Cartridge-Receiving Section 110]

Figure 5:
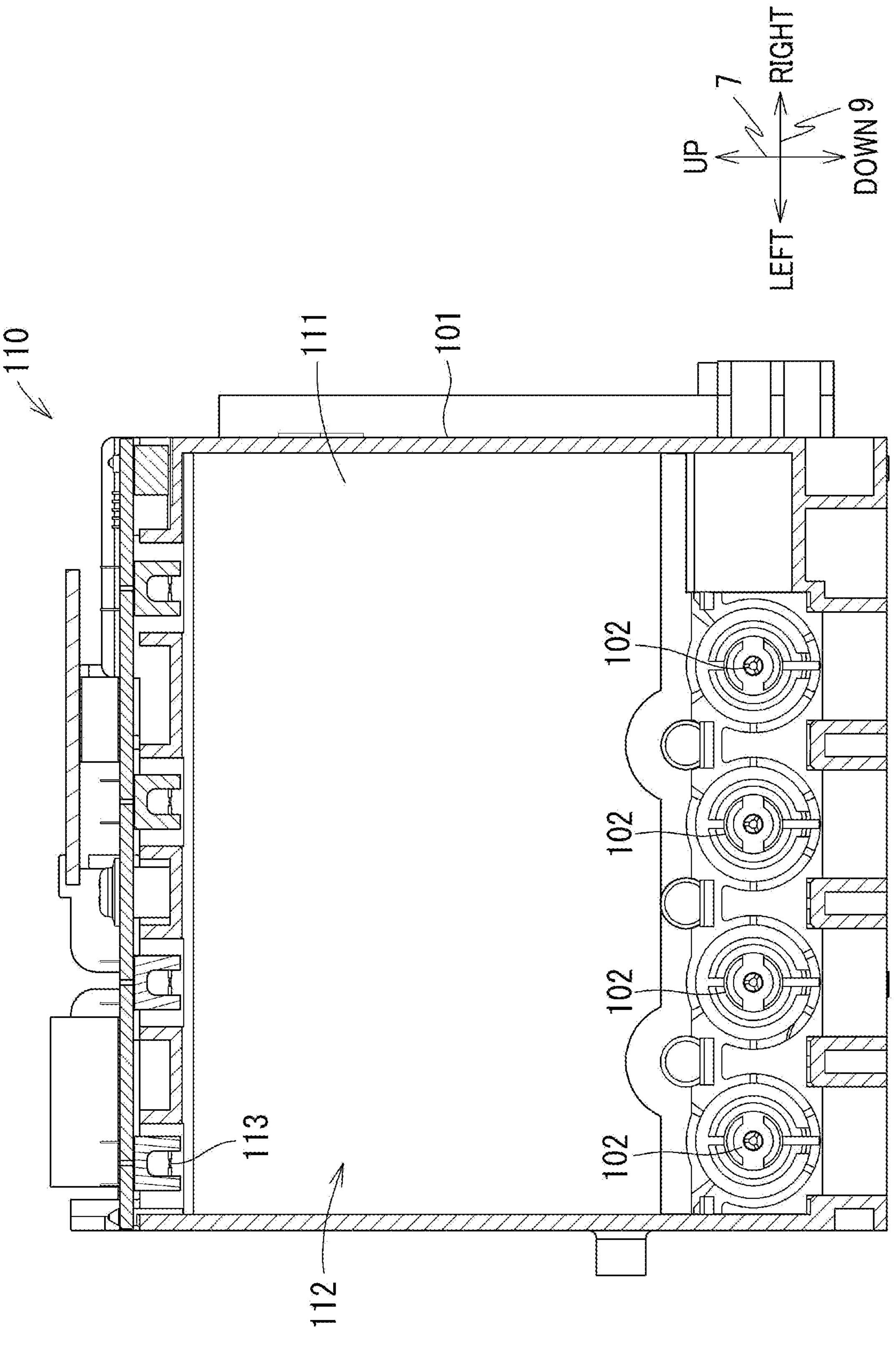
FIG. 5 is a front view of a cartridge receiving section 110 of the printer portion 11.

As illustrated in FIG. 5, the cartridge-receiving section 110 includes a cartridge case 101, and four ink needles 102. The cartridge-receiving section 110 is configured to receive the ink cartridge 30 storing black ink therein.

As illustrated in FIG. 5, the cartridge case 101 has a box-like shape that is open frontward to provide an opening 112. The opening 112 can be exposed to the outside at the front surface of the multifunction peripheral 10. The front surface of the multifunction peripheral 10 is a surface that a user faces when using the multifunction peripheral 10. The opening 112 of the cartridge case 101 is exposed to the outside when the cover 70 is opened. The ink cartridge 30 can be inserted into and removed from the cartridge case 101 through the opening 112.

Each ink needle 102 is a hollow tube. The ink needles 102 are positioned at a lower end portion of an end wall 111 of the cartridge case 101 (see FIG. 5). The end wall 111 defines a rear end of an internal space of the cartridge case 101. Each ink needle 102 protrudes frontward from the end wall 111 to have a tip end (front end) that is open frontward. The four ink needles 102 are arranged spaced apart from one another other in the left-right direction 9 at the end wall 111. The ink needle 102 positioned leftmost among the four ink needles 102 is connected to an ink supply portion 92 (described later) of the ink cartridge 30. The leftmost ink needle 102 is an example of a "joint" of the disclosure.

In the internal space of the cartridge case 101, a lock shaft 113 is provided at a position adjacent to a top surface of the cartridge case 101 near the opening 112. The lock shaft 113 is a bar-like member extending in the left-right direction 9. On the lock shaft 113, a locking surface 90 (described later) of the ink cartridge 30 is configured to abut, thereby functioning to retain the ink cartridge 30 inside the cartridge-receiving section 110.

As illustrated in FIG. 2, the ink tank 103 is positioned rearward of the cartridge case 101. As illustrated in FIG. 3, the tank 103 is a singular unit and has a dimension in the left-right direction 9 that is generally the same as a dimension in the left-right direction 9 of the cartridge case 101. As illustrated in FIG. 2, the tank 103 has a box-like shape defining a second storage chamber 115 therein. The second storage chamber 115 is configured to store ink therein. An air communication port 114 is provided at an upper end portion of the tank 103 to allow communication of air between the second storage chamber 115 and the outside of the tank 103 through the air communication port 114. In this way, the second storage chamber 115 is open to the atmosphere.

The tank 103 has a front end portion connected to the four ink needles 102, so that the second storage chamber 115 is in communication with an internal space of each ink needle 102. In the present embodiment, the ink is allowed to flow into the second storage chamber 115 through the ink needle 102 that is positioned leftmost among the four ink needles 102. The air communication port 114 is an example of a "second air communication port" of the disclosure.

Four ink outlet ports 116 are positioned below the second storage chamber 115 (see FIG. 2). Although a single ink outlet port 116 is illustrated in FIG. 2, the four ink outlet ports 116 are arranged spaced apart from one another in the left-right direction 9. As illustrated in FIG. 3, the four ink tubes 32 are connected to the respective four ink outlet ports 116. The ink stored in the second storage chamber 115 is supplied to the recording head 39 through the respective four ink outlet ports 116 and four ink tubes 32. The second storage chamber 115 and the four ink outlet ports 116 are an example of a "branching portion" of the disclosure. The ink outlet ports 116 are an example of "a plurality of liquid channels" of the disclosure.

Incidentally, in this embodiment, the ink needle 102 is connected to the ink outlet port 116 through the second storage chamber 115 of the tank 103. In the present disclosure, the expression "the ink needle 102 (as an example of the joint) and the ink outlet port 116 (as an example of the branching portion) are connected to each other" includes a configuration of the present embodiment where the ink needle 102 and the ink outlet port 116 are connected to each other through the second storage chamber 115.

The tank 103 also includes an ink sensor 104 (see FIG. 2). The ink sensor 104 is positioned outside of the tank 103 at the same position (height) as the ink needles 102 in the up-down direction 7. The ink sensor 104 includes a light-emitting element configured to emit light toward the tank 103 and a light-receiving element configured to receive light from the tank 103. An outer wall of the tank 103 positioned to oppose the ink sensor 104 has a region serving as a light transmitting prism. The prism is configured to reflect the light emitted from the light-emitting element when the prism contacts the ink in the second storage chamber 115, and transmit the light emitted from the light-emitting element when the prism does not contact the ink in the second storage chamber 115. The ink sensor 104 is configured to output signals in response to an intensity of the light received by the light-receiving element. The controller is configured to determine whether the level of the ink stored in the second storage chamber 115 is at the height of the ink sensor 104 based on the signals outputted from the ink sensor 104.

[Ink Cartridge 30]

Figure 6:
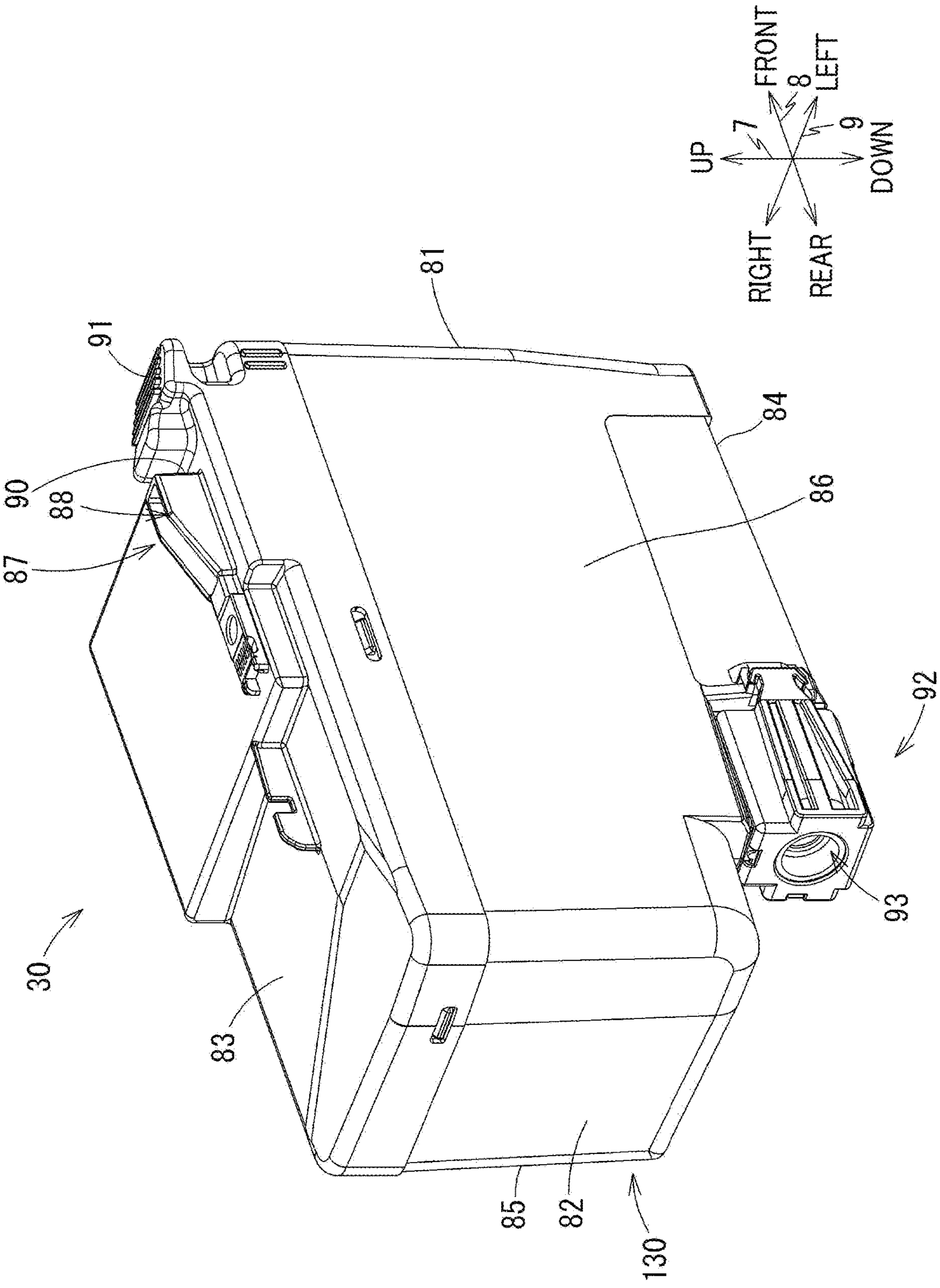
FIG. 6 is a perspective view illustrating an exterior of an ink cartridge 30.

The ink cartridge 30 is a container configured to store ink therein. In the present embodiment, black ink is stored in the ink cartridge 30. The ink cartridge 30 has dimensions in the up-down direction 7, the front-rear direction 8, and the left-right direction 9 that are slightly smaller than corresponding internal dimensions of the cartridge case 101 in the up-down direction 7, the front-rear direction 8, and the left-right direction 9. In FIG. 6, the ink cartridge 30 in its operable posture.

The ink cartridge 30 includes a front wall 81, a rear wall 82, an upper wall 83, a lower wall 84, and a pair of side walls 85 and 86. As illustrated in FIG. 2, these walls 82, 83, 84, 85 and 86 together define the first storage chamber 80 (see FIG. 2) of the ink cartridge 30. The first storage chamber 80 stores ink (black ink) therein.

A protrusion 87 is formed on the upper wall 83 to protrude upward therefrom. The protrusion 87 has a hollow internal space therein that communicates with an air communication hole 89 (FIG. 2) of the first storage chamber 80. The protrusion 87 has an aperture 88 that is open upward. The air communication hole 89 is in communication with the outside of the ink cartridge 30 through the internal space of the protrusion 87 and the aperture 88. That is, the first storage chamber 80 is open to the atmosphere.

The protrusion 87 has a front surface serving as the locking surface 90. The locking surface 90 facing frontward is positioned above the upper wall 83. The locking surface 90 extends in the up-down direction 7 from the upper wall 83. The locking surface 90 is configured to abut on the lock shaft 113 frontward in a state where the ink cartridge 30 is attached to the cartridge-receiving section 110.

The protrusion 87 has an upper surface configured of a horizontal surface and a sloped surface. The sloped surface is positioned rearward of the horizontal surface. The sloped surface is sloped to face upward and rearward. During attachment of the ink cartridge 30 to the cartridge-receiving section 110, the sloped surface on the upper surface of the protrusion 87 contacts the lock shaft 113 such that the lock shaft 113 is guided along the upper surface of the protrusion 87 smoothly to reach a position frontward of the locking surface 90.

On the protrusion 87, an operation portion 91 is also provided at a position frontward of the locking surface 90. The operation portion 90 is configured to be operated by a user to remove the ink cartridge 30 from the cartridge-receiving section 110.

As illustrated in FIG. 6, the ink supply portion 92 is positioned below the rear wall 82 in a left end portion of the ink cartridge 30. The ink supply portion 92 has a supply opening 93 that is open rearward. The supply opening 93 is in communication with the first storage chamber 80. The supply opening 93 can be opened and closed by a valve, for example. Into this supply opening 93, the leftmost ink needle 102 among the four ink needles 102 is to be inserted. The internal space of the leftmost ink needle 102 inserted in the supply opening 93 is allowed to communicate with the first storage chamber 80. The ink stored in the first storage chamber 80 is thus allowed to flow into the second storage chamber 115 of the tank 103 through the internal space of the leftmost ink needle 102 inserted in the supply opening 93 of the ink supply portion 92. Since the first storage chamber 80 and the second storage chamber 115 are both in communication with the atmosphere, the ink stored in the first storage chamber 80 can flow into the second storage chamber 115 due to the difference (water head difference) between the level of the ink stored in the first storage chamber 80 and the level of the ink stored in the second storage chamber 115.

[Operational and Technical Advantages of the Embodiment]

According to the above-described embodiment, the multifunction peripheral 10 for monochromatic printing can be realized by using the recording head 39 having the plurality of nozzles 40, the four ink tubes 32 connected to the recording head 39, and the cartridge-receiving section 110 provided with the four ink needles 102. On the other hand, the recording head 39 having the four arrays of the nozzles 40 can also be employed, for example, in a color printer to perform color printing with four different colors of ink. The four ink tubes 32 connected to the recording head 39 can also function to supply the four different colors of ink to the recording head 39. Further, the cartridge-receiving section 110 including the four ink needles 102 can receive four kinds of ink cartridges respectively storing ink of four different colors. Therefore, those components for the multifunction peripheral 10 configured to perform monochromatic printing can also be utilized as components for a color printer to perform color printing. Parts sharing can be realized between monochromatic printers and color printers.

Further, the ink in the ink cartridge 30 can be supplied to the recording head 39 through the four ink tubes 32 in the depicted embodiment. This structure is beneficial in suppressing an increase in cross-sectional area of each ink tube 32, compared to a structure where only one ink tube 32 is provided for supplying the ink from the ink cartridge 30 to the recording head 39 at the same flow rate. Further, in the embodiment, a single ink cartridge 30 can be attached to the cartridge-receiving section 110 which provides an internal space large enough to receive four ink cartridges. As such, the ink cartridge 30 according to the embodiment can have a larger capacity to store a larger amount of ink (black) therein.

Further, since the refill unit 100 includes the tank 103, the ink stored in the second storage chamber 115 of the tank 103 can be supplied to the recording head 39 to be used for printing even if little ink is left in the first storage chamber 80 of the ink cartridge 30. Further, the tank 103 having only one second storage chamber 115 is provided in a space large enough to arrange a plurality of second storage chambers therein for color printing in plurality of colors of ink in a color printer. Hence, the second storage chamber 115 can have a larger capacity than otherwise.

Further, since the first storage chamber 80 and the second storage chamber 115 are respectively in communication with the atmosphere, the ink stored in the first storage chamber 80 can flow into the second storage chamber 115 due to the water head difference between the level of the ink stored in the first storage chamber 80 and the level of the ink stored in the second storage chamber 115.

Further, since the ink sensor 104 is provided at the tank 103, there is no need to provide an ink detection mechanism in the ink cartridge 30, thereby simplifying the structure of the ink cartridge 30.

Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

[First Modification]

Figure 7:
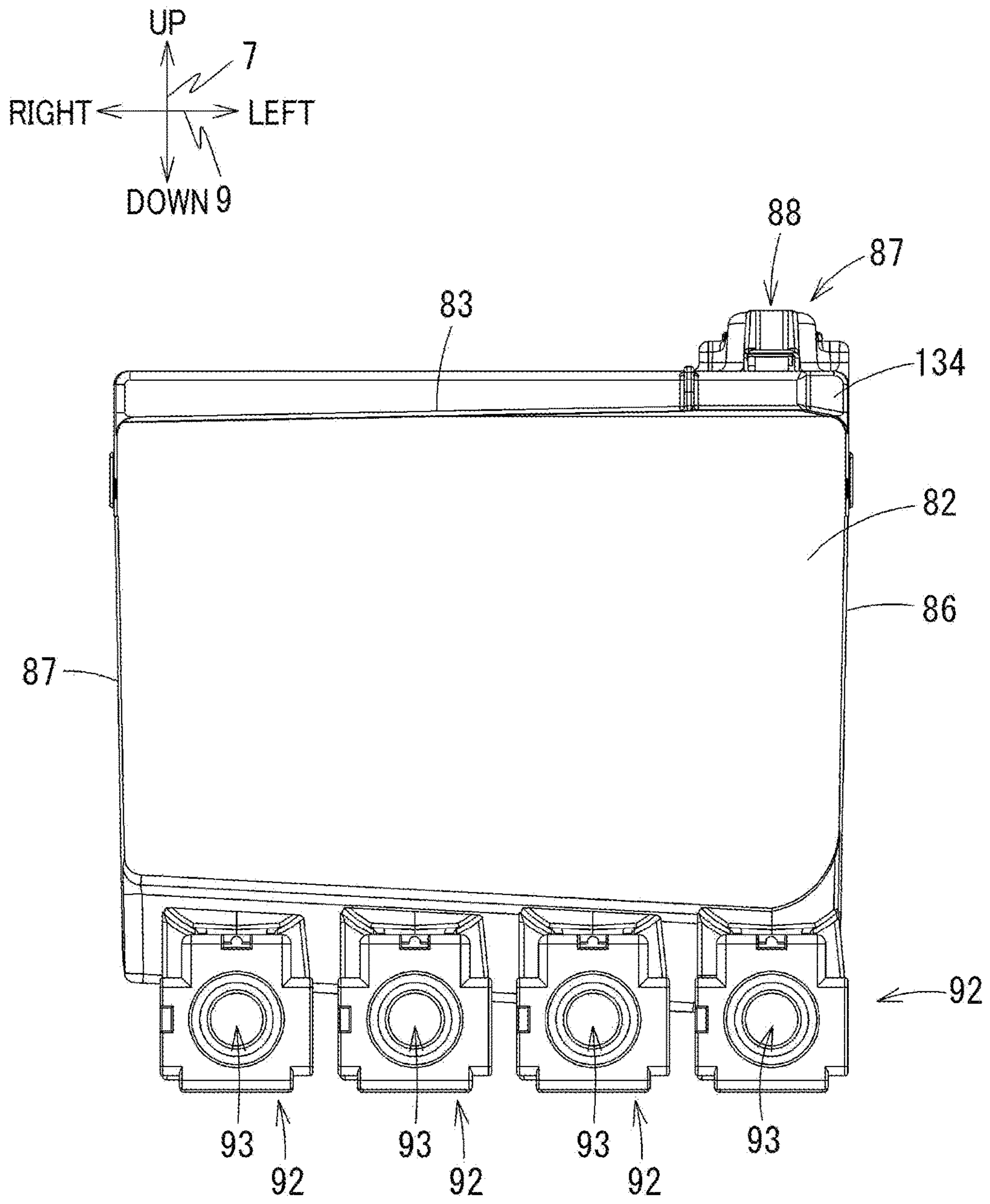
FIG. 7 is a rear view of an ink cartridge 230 according to a first modification to the embodiment.

In the above-described embodiment, the ink cartridge 30 includes the single ink supply portion 92. In contrast, as illustrated in FIG. 7, four ink supply portions 92 may be provided in an ink cartridge 230 according to a first modification to the embodiment. In this first modification, the supply opening 93 of each ink supply portion 92 is in communication with the first storage chamber 80 of the ink cartridge 230. In a state where the ink cartridge 230 is attached to the cartridge-receiving section 110, each of the four ink needles 102 of the cartridge-receiving section 110 is inserted into the corresponding supply openings 93 of the four ink supply portions 92. Accordingly, ink in the first storage chamber 80 of the ink cartridge 230 flows therefrom to the second storage chamber 115 of the tank 103 through the four supply openings 93 (four ink supply portions 92). With this configuration, the ink flow is less likely to be interrupted due to flow resistance at each ink needle 102 and each ink supply portion 92. Accordingly, a shortage in ink supply is less likely to occur. In this modification, the four ink needles 102 are an example of "a plurality of joints" of the disclosure.

Figure 8:
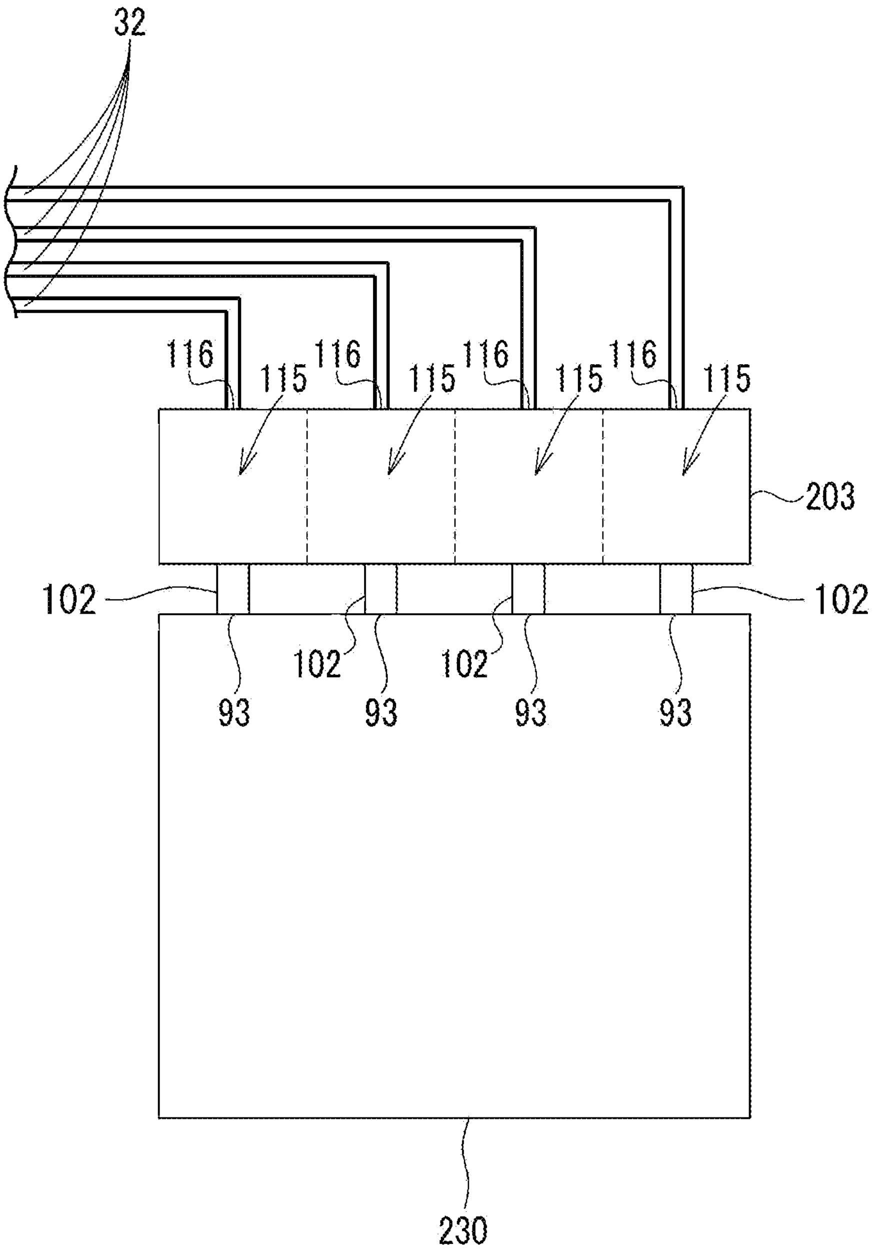
FIG. 8 is a schematic view of a tank 203 according to a variation of the first modification.

Further, in this first modification where the four ink needles 102 are respectively inserted in the respective supply openings 93 of the four ink supply portions 92 of the ink cartridge 30, four second storage chambers 115 corresponding to the four ink needles 102 may be provided in a tank 203, as illustrated in FIG. 8. Specifically, in this case, the four ink outlet ports 116 are provided one for each second storage chamber 115. In this modification, the four second storage chambers 115 are an example of "a plurality of second storage chambers" of the disclosure, the four supply openings 93 are an example of "a plurality of supply openings" of the disclosure, and the four ink outlet ports 116 are an example of "a plurality of liquid channels" of the disclosure.

[Second Modification]

Figure 9:
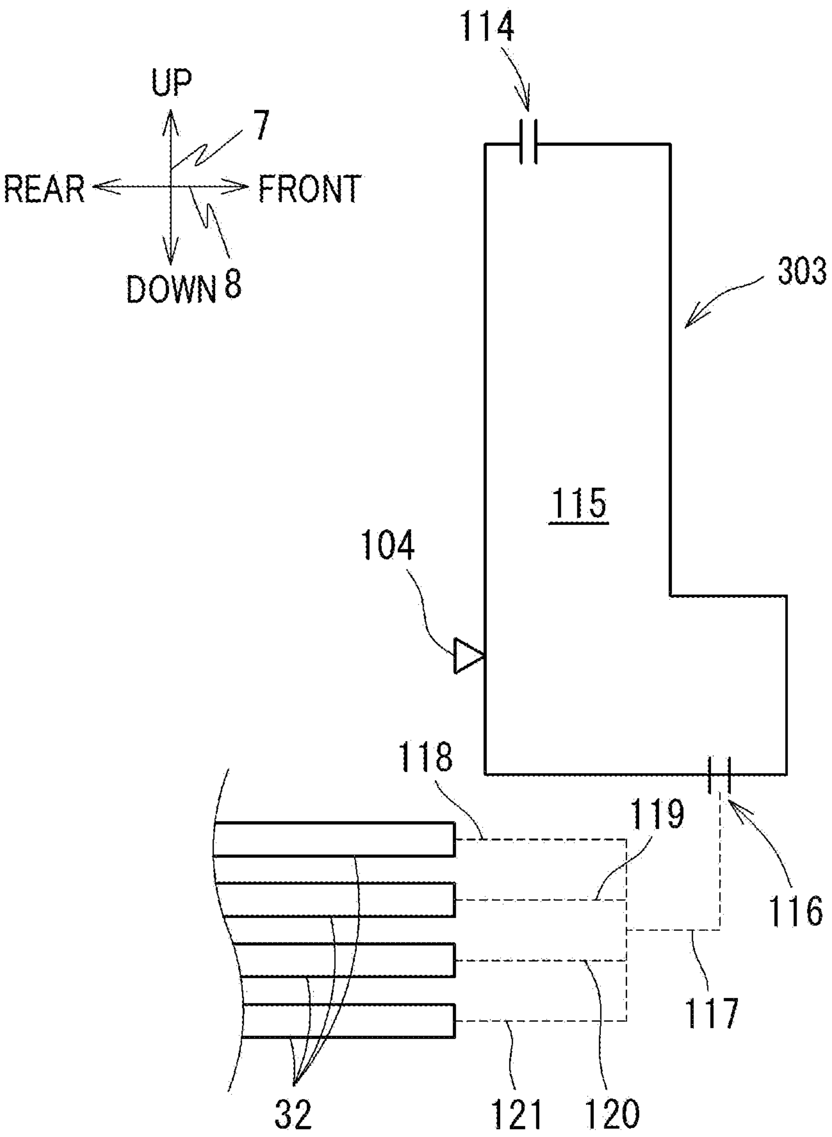
FIG. 9 is a schematic view of a tank 303 according to a second modification to the embodiment.

In the above-described embodiment, the tank 103 has the four ink outlet ports 116. In contrast, as a second modification to the embodiment, only one ink outlet port 116 may be provided at the tank of the disclosure. Specifically, as illustrated in FIG. 9, a tank 303 according to the second modification includes a single ink outlet port 116. In this modification, the ink outlet port 116 is connected to each of the four ink tubes 32 through an ink channel 117. The ink channel 117 has one end connected to the ink outlet port 116, and another end that is branched into four channels 118, 119, 120, and 121 each connected to the corresponding one of the ink tubes 32. In the second modification, the second storage chamber 115, the ink outlet port 116, the ink channel 117, and the ink channels 118, 119, 120, and 121 are an example of the "branching portion" of the disclosure. The ink channels 118, 119, 120, and 121 are an example of the "plurality of liquid channels" of the disclosure.

Further, in the second modification illustrated in FIG. 9, the tank 303 may be omitted. In this case, the one end of ink channel 117 is directly connected to the leftmost ink needle 102 among the four ink needles 102.

[Third Modification]

Figure 10:
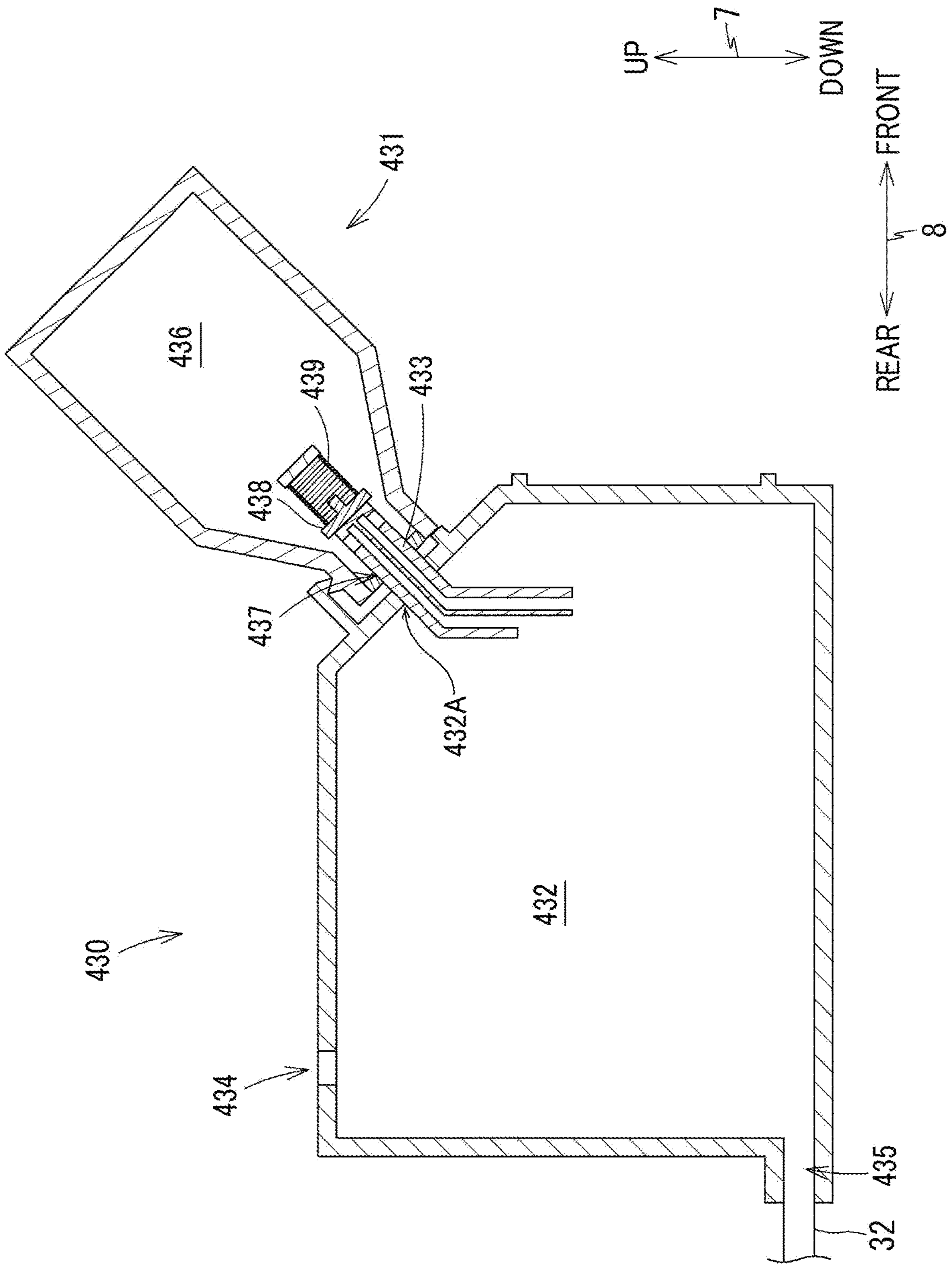
FIG. 10 is a vertical cross-sectional view schematically illustrating a tank 430 and a bottle 431 connected to each other according to a third modification to the embodiment.

In the refill unit 100 according to the above-described embodiment, the ink cartridge 30 is detachably attachable to the cartridge-receiving section 110. However, the refill unit 100 may have other configurations. For example, as illustrated in FIG. 10, a tank 430 is fixed to the housing of the multifunction peripheral 10, and a bottle 431 is connectable to the tank 430 to supply ink thereto. The tank 430 has a generally box-like shape providing an internal space therein as a storage chamber 432 configured to store ink. An ink needle 433 is provided at the tank 430 to extend outwardly therefrom through an opening 432A. The ink needle 433 is a hollow tubular member defining an air channel and a liquid channel therein. The air channel and the liquid channel of the ink needle 433 provide communication between the storage chamber 432 and the outside of the tank 430. In the third modification, the storage chamber 432 is an example of the "second storage chamber" of the disclosure, and the ink needle 433 is an example of the "joint" of the disclosure.

The tank 430 has an air communication hole 434. The air communication hole 434 allows the storage chamber 432 to communicate with the outside of the tank 430. Further, the tank 430 has four ink outlet ports 435. Although only one ink outlet port 435 is illustrated in FIG. 10, the four ink outlet ports 435 are arranged spaced apart from one another in the left-right direction 9, i.e., in a direction orthogonal to the sheet surface of FIG. 10. Each of the four ink outlet ports 435 is connected to a corresponding one of the four ink tubes

32. In the third modification, the storage chamber 432 and the four ink outlet ports 435 are an example of the "branching portion" of the disclosure. The four ink outlet ports 435 are an example of the "plurality of liquid channels" of the disclosure.

Incidentally, the tank 430 illustrated in FIG. 10 may have only one ink outlet port 435, rather than four ink outlet ports 435. In this case, the single ink outlet port 435 may be connected to each of the four ink tubes 32 through an ink channel similar to the ink channel 117 illustrated in FIG. 9. That is, the ink channel may have one end connected to the single ink outlet port 435, and another end that is branched into four channels each connected to the corresponding one of the four ink tubes 32.

The bottle 431 has an internal space serving as a storage chamber 436. The bottle 431 has an opening 437. The storage chamber 436 is in communication with the outside of the bottle 431 through the opening 437. The opening 437 is configured to be closed by a valve 438 that is urged by a spring 439. Upon insertion of the ink needle 433 into the opening 437 of the bottle 438, the ink needle 433 moves the valve 438 away from the opening 437 against an urging force of the spring 439, thereby causing the ink in the storage chamber 436 of the bottle 431 to flow into the storage chamber 432 of the tank 430 through the ink needle 433 by gas-liquid substitution. In this modification, the bottle 431 is an example of the "liquid container" of the disclosure, the storage chamber 436 is an example of the "first storage chamber" of the disclosure, and the opening 437 is an example of the "supply opening" of the disclosure.

Incidentally, the ink needle 433 may be provided on the bottle 431, rather than on the tank 430, such that the ink needle 433 protrudes outward from the opening 437 to provide communication between the storage chamber 436 and the outside. In this case the ink needle 433 of the bottle 431 is inserted into the opening 432A of the tank 430 to allow ink in the storage chamber 436 to flow into the storage chamber 432. In this example, the ink needle 433 provided at the bottle 431 is an example of the "joint" of the disclosure.

[Fourth Modification]

Figure 11:
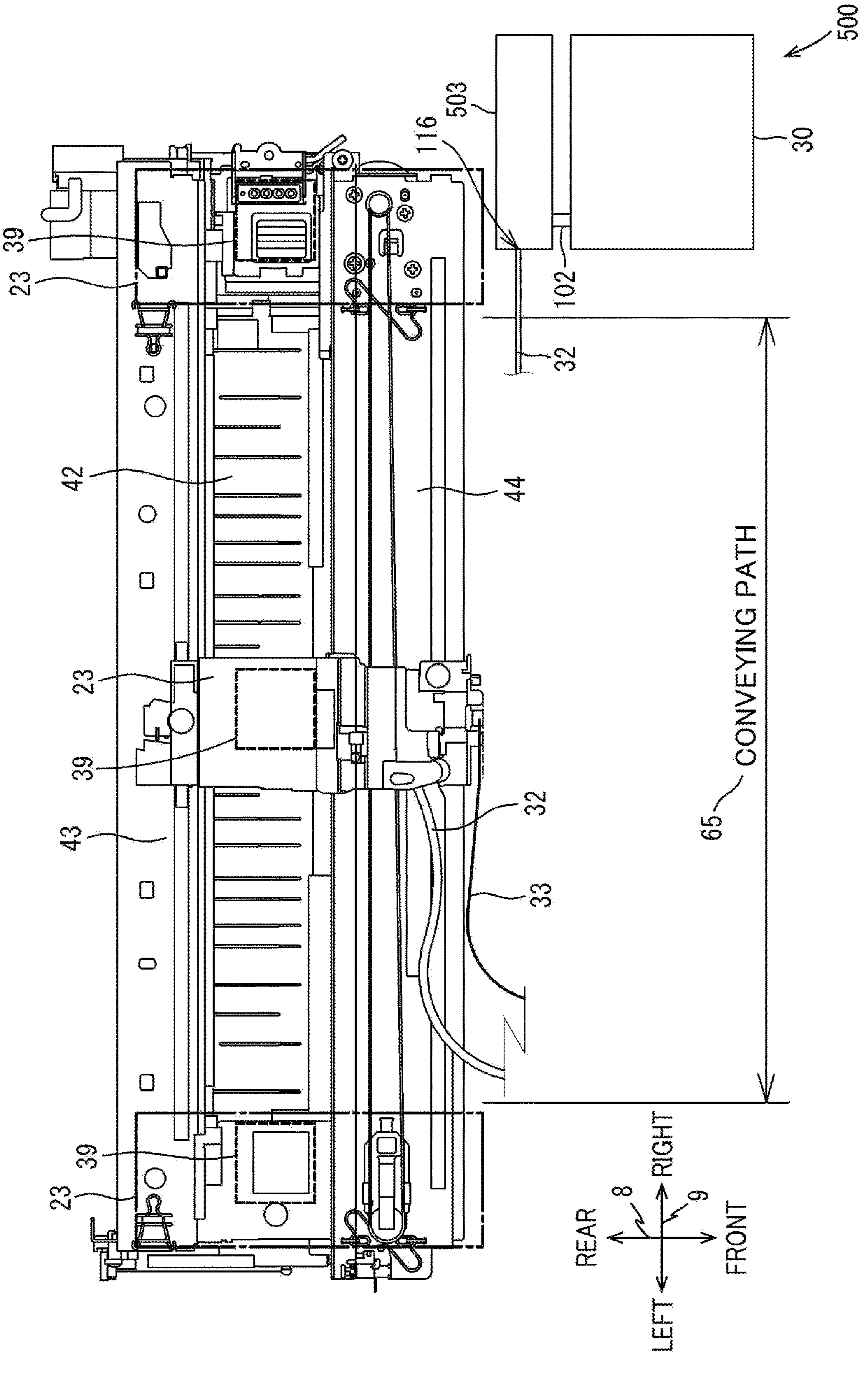
FIG. 11 is a plan view schematically illustrating an internal structure of a printer portion according to a fourth modification to the embodiment.
Figure 12:
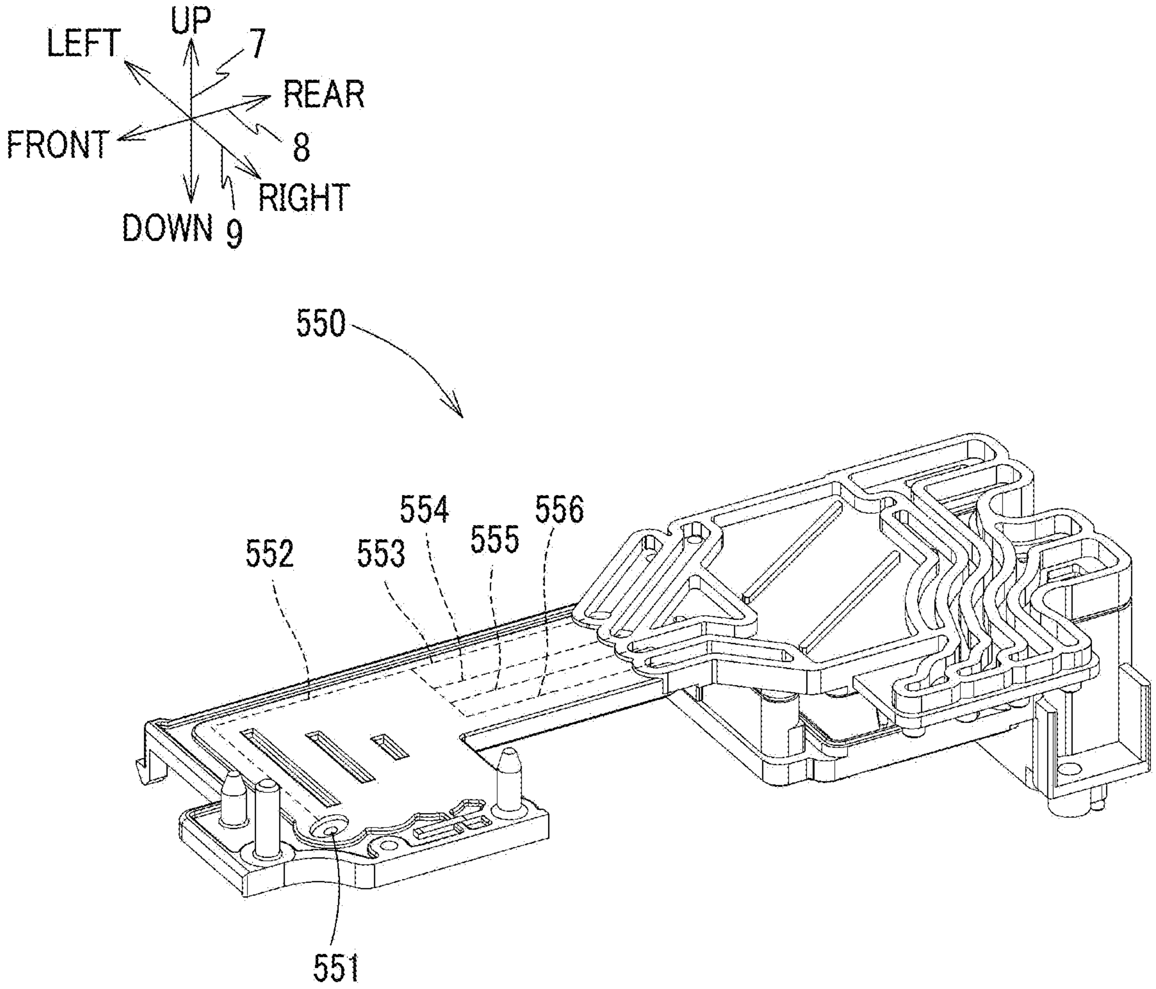
FIG. 12 is a perspective view of a channel member 550 according to the fourth modification.

In the above-described embodiment, the branching portion of the disclosure (i.e., the four ink outlet ports 116) is provided at the refill unit 100. Alternatively, the branching portion of the disclosure may be realized at the recording head 39. For example, as illustrated in FIGS. 11 and 12, in a refill unit 500 according to a fourth modification, a tank 503 has one ink outlet port 116. To the single ink outlet port 116, only one ink tube 32 is connected. The recording head 39 includes a channel member 550 (see FIG. 12) to which the single ink tube 32 is connected.

As illustrated in FIG. 12, the channel member 550 has a connecting port 551 to which the single ink tube 32 is connected. The connecting port 551 is in communication with a single ink channel 552 at one end thereof. The ink channel 552 extends from the connecting port 551 and is then branched into four ink channels 553, 554, 555, and 556, each of which is connected to the corresponding one of the four arrays of the nozzles (nozzle arrays) 40 at the recording head 39 (see FIG. 4). The channel member 550 of the present modification is an example of the "branching portion" of the disclosure. The ink channels 553, 554, 555, and 556 are an example of the "plurality of liquid channels" of the disclosure. With this structure as well, a monochromatic image can be formed by using the recording head 39 having the plurality of nozzles 40. Further, this configuration can enlarge the capacity of the first storage chamber 80 of the ink cartridge 30.

[Other Variations and Modifications]

In the refill unit 100 according to the embodiment, the ink stored in the first storage chamber 80 of the ink cartridge 30 flows into the second storage chamber 115 of the tank 103 due to the water head difference. However, this is not the only way to supply the ink from the ink cartridge 30 to the tank 103. For example, the ink may be supplied from the first storage chamber 80 to the second storage chamber 115 by gas-liquid substitution such as so-called "chicken-feed" system or by operating a pump.

In the above-described embodiment, the ink sensor 104 is provided at the tank 103. However, the ink sensor 104 may not be provided at the tank 103.

In the above-described embodiment, the recording head 39 is mounted on the carriage 23, and is configured to eject ink droplets while making reciprocating movement in the left-right direction 9. However, the recording head 39 may not be mounted on the carriage 23. In this case, the nozzle surface of the recording head 39 may extend over a movable range of the carriage 23. Here, the number of the recording head 39 to be employed may be one or plural.

In the above-described embodiment, the four ink needles 102, four ink tubes 32, and four arrays of the nozzles (nozzle arrays) 40 are employed. However, the numbers of these elements (the ink needles 102, ink tubes 32, and nozzles 40) need not be four.

The recording head 39 having the four nozzle arrays 40 according to the embodiment is also applicable to a color printer configured to perform color printing in four different colors of ink. In this case, in order to perform color printing in four colors, four ink cartridges need not be attached to the refill unit 100 as in the embodiment, but three or less than three ink cartridges may be attached to the refill unit 100. For example, among four ink cartridges corresponding to the four different colors (cyan, magenta, yellow, and black), three ink cartridges corresponding to the three colors other than black (i.e., cyan, magenta, and yellow) may be attached to the refill unit 100, and the ink cartridge for the black color may be attached to a refill unit different from the refill unit 100. In this configuration, the ink of three different colors are supplied to the recording head 39 from the respective three kinds of ink cartridges attached to the refill unit 100 through three ink tubes 32, respectively, while the black ink is supplied to the recording head 39 from the ink cartridge attached to the other refill unit through one corresponding ink tube 32.

What is claimed is:

1. An image-forming apparatus to which a liquid container is connectable, the liquid container including a first storage chamber configured to store a single color liquid therein, the image-forming apparatus comprising:

- a tank including:
  - a second storage chamber configured to store the single color liquid supplied from the liquid container; and
  - a plurality of outlet ports, wherein the single color liquid in the second storage chamber is allowed to flow out through each of the plurality of outlet ports;
- a plurality of tubes each connected to a corresponding one of the plurality of outlet ports; and
- a recording head comprising a plurality of nozzle arrays, each nozzle array being an array of nozzles and being connected to a corresponding one of the plurality of tubes, the recording head being configured to eject the single color liquid through each nozzle array.

2. The image-forming apparatus according to claim 1,
wherein the tank includes a prescribed number of inlet ports through which the single color liquid in the liquid container is allowed to flow into the second storage chamber, the prescribed number being at least one and being smaller than the number of the tubes.

3. The image-forming apparatus according to claim 2,
wherein the prescribed number is one.

4. The image-forming apparatus according to claim 1,
wherein each of the plurality of tubes is arranged to extend in a left-right direction, and
wherein the plurality of tubes is arrayed with one another in a front-rear direction.

5. The image-forming apparatus according to claim 1,
wherein the liquid container has a first air communication port to allow the first storage chamber to communicate with ambient air,
wherein the tank has a second air communication port to allow the second storage chamber to communicate with ambient air, and
wherein the second storage chamber has a portion that is positioned below the first storage chamber of the liquid container connected to the image-forming apparatus.

6. The image-forming apparatus according to claim 1, further comprising a joint to which a supply opening of the liquid container is connectable, the joint being in fluid communication with the second storage chamber,
wherein the second storage chamber is configured to store the single color liquid supplied from the liquid container through the joint in a state where the liquid container is connected to the joint.

7. The image-forming apparatus according to claim 6,
wherein the liquid container is a cartridge, and
wherein the joint is connectable to and removable from the supply opening of the cartridge.

8. The image-forming apparatus according to claim 6,
wherein the tank includes the joint, the joint defining therein two channels through each of which the second storage chamber is in communication with an outside of the tank, and
wherein the two channels are inserted in the supply opening of the liquid container upon connection of the liquid container to the joint.

9. The image-forming apparatus according to claim 1, further comprising a detector configured to detect a level of the single color liquid stored in the second storage chamber.

10. The image-forming apparatus according to claim 1,
wherein the recording head is configured to eject the single color liquid through the nozzle arrays while moving in a scanning direction.

11. An image-forming apparatus comprising:
a liquid container having:
a first storage chamber configured to store a single color liquid therein; and
a plurality of supply openings, wherein the single color liquid stored in the first storage chamber is allowed to flow out through each of the plurality of supply openings;
a plurality of joints each connectable to a corresponding one of the plurality of supply openings of the liquid container;
a plurality of second storage chambers each connected to a corresponding one of the plurality of joints, each of the plurality of second storage chambers configured to store the single color liquid received from the first storage chamber;
a plurality of liquid channels each connected to a corresponding one of the plurality of second storage chambers;
a plurality of tubes each connected to a corresponding one of the plurality of liquid channels; and
a recording head comprising a plurality of nozzle arrays, each nozzle array being an array of nozzles and being connected to a corresponding one of the plurality of tubes, the recording head being configured to eject the single color liquid through each nozzle array.

12. An image-forming apparatus comprising:
a liquid container having:
a first storage chamber configured to store liquid therein; and
a supply opening through which the liquid in the first storage chamber is allowed to flow out;
a joint connectable to the supply opening of the liquid container;
a tube having a first end and a second end, the first end of the tube being connected to the joint;
a branching portion connected to the second end of the tube, the branching portion being branched into a plurality of liquid channels; and
a recording head comprising a plurality of nozzle arrays, each nozzle array being an array of nozzles and being connected to a corresponding one of the plurality of liquid channels, the recording head being configured to eject the liquid through each nozzle array.

13. The image-forming apparatus according to claim 12, wherein the branching portion is disposed on the recording head.

14. The image-forming apparatus according to claim 12, further comprising a tank connected to the joint,
wherein the first end of the tube is connected to the joint via the tank.

* * * * *